United States Patent
Park et al.

(10) Patent No.: US 7,450,938 B2
(45) Date of Patent: Nov. 11, 2008

(54) METHOD FOR IMPROVING COMMUNICATION SUCCESS RATE IN SIMULTANEOUS CALL TRIAL BETWEEN SUBSCRIBERS IN MOBILE COMMUNICATION SYSTEMS

(75) Inventors: Jong-Man Park, Anyang-si (KR); Kyung-Chik Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 471 days.

(21) Appl. No.: 11/334,785

(22) Filed: Jan. 18, 2006

(65) Prior Publication Data
US 2006/0160531 A1 Jul. 20, 2006

(30) Foreign Application Priority Data
Jan. 18, 2005 (KR) .................. 10-2005-0004679

(51) Int. Cl.
*H04M 3/00* (2006.01)
(52) U.S. Cl. ............ 455/418; 455/433; 455/141.1; 379/229; 379/377; 370/335
(58) Field of Classification Search .......... 455/418, 455/433, 141.1; 379/229, 377; 370/335
See application file for complete search history.

(56) References Cited

U.S. PATENT DOCUMENTS

2001/0029182 A1* 10/2001 McCann et al. ............ 455/433
2003/0161460 A1* 8/2003 Dammrose ................ 379/229
2004/0174983 A1* 9/2004 Olschwang et al. ........ 379/377
2004/0198326 A1* 10/2004 Hirani .................... 455/414.1
2005/0174970 A1* 8/2005 Krishnamurthi et al. .... 370/335

FOREIGN PATENT DOCUMENTS

| KR | 1020030076078 | 9/2003 |
| KR | 1020040009241 | 1/2004 |
| KR | 2004-0094545 | 11/2004 |
| KR | 1020040102646 | 12/2004 |

* cited by examiner

*Primary Examiner*—Dwayne Bost
*Assistant Examiner*—Michael T Vu
(74) *Attorney, Agent, or Firm*—The Farrell Law Firm, PC

(57) ABSTRACT

Disclosed is a method for improving a communication success rate in a simultaneous call trial between subscribers in a mobile communication system. The method includes receiving by a second subscriber network an IAM message from a first subscriber network when a first subscriber tries a call to a second subscriber; determining by the second subscriber network whether the second subscriber has requested a termination to the first subscriber, after receiving the IAM; aborting by the second subscriber network an originating call trial of the second subscriber when the second subscriber has requested the termination; trying by the second subscriber network a page to the second subscriber after aborting the originating call trial; and setting a call between the first subscriber and the second subscriber by the first subscriber network and the second subscriber network, after succeeding in paging the second subscriber.

21 Claims, 7 Drawing Sheets

METHOD FOR IMPROVING COMMUNICATION SUCCESS RATE IN SIMULTANEOUS CALL TRIAL BETWEEN SUBSCRIBERS IN MOBILE COMMUNICATION SYSTEMS

PRIORITY

This application claims priority to an application entitled "Method For Improving Communication Success Rate In Simultaneous Call Trial between Subscribers In Mobile Communication System" filed in the Korean Intellectual Property Office on Jan. 18, 2005 and assigned Serial No. 2005-4679, the contents of which are incorporated herein by reference.

BACKGROUND OF THE INVENTION

1. Field of the Invention

The present invention relates to a mobile communication system, and more particularly, to a method for improving the communication success rate in a simultaneous call trial between subscribers.

2. Description of the Related Art

Generally, a base station, a Mobile Switching Center (MSC), a wire cable, and electric waves are used for communication between two counterparts by a mobile communication terminal. A mobile communication terminal connects with a base station through electric waves, with the base stations connected through optical fibers, satellites, etc. Further, the MSC is disposed between base stations and performs various functions to support wireless communication. In addition, a mobile communication terminal frequently registers its own location in the MSC of a corresponding base station. When a call is received, the mobile communication terminal connects with the corresponding base station according to the registration and performs communication.

A core network for operation of a mobile communication terminal includes an MSC, a Home Location Register (HLR), a Visitor Location Register (VLR), a Service Control Point (SCP), and an Intelligent Network (IN).

The MSC processes signals originated from, or terminated in, each mobile base station and performs a central control function for controlling each mobile base station to operate efficiently. Further, the MSC tracks the mobile communication terminal location and asks the HLR for location registration information of a user. The HLR informs the MSC of various information relating to an originating state or a terminating state of a subscriber, a supplementary service, etc., and a subscriber location. When the location information is received from the HLR, the MSC simultaneously calls mobile communication terminals of users through all base stations located in a corresponding area.

The SCP is a database storing information for controlling a service provided to a subscriber. A representative example of the SCP is the HLR. Further, the SCP relates to the multiple subscriber number service (e.g., 800 numbers), a caller ID service, a short message service, etc.

The HLR is a database for storing subscriber information and includes service type and home switch office ID information. A home location is a location first searched for determining a location of a mobile communication terminal. Generally, a base station nearest to the place at which a subscriber has joined the service is registered as a home location. When a user calls for the first time, an MSC within the base station controlled by a corresponding switching center tracks a home switch office identifier (ID) registered in the HLR and checks whether the terminating terminal exists in the region controlled by the base station. If the corresponding terminating terminal does not exist in the region, the MSC searches a database of the VLR.

The VLR is a database for registering a location of a terminal deviating from a home switch office. A terminal frequently reports its own location through a nearest base station and the ID of the base station is registered in the VLR. When a terminating terminal is not found within the home location after a user telephones, the MSC finds out the ID of the base station registered in the VLR and sends a signal to the found base station. In this way, the user connects with the terminating terminal.

Herein, a 'Send Routing Information (SRI)' message is a message transmitted from the MSC to the HLR to obtain a VLR address of a terminating network where a receiver is located. The HLR sends a 'Provide Roaming Number (PRN)' message to the network of the called subscriber after receiving the 'SRI' message. The PRN message is used for requesting a roaming number of a terminating VLR, that is, an address value.

Further, an Initial Address Message (IAM) is a standard interoffice signaling message of an Integrated Service Digital Network (ISDN), which is transmitted when an originating MSC first tries signaling to a terminating MSC. The terminating MSC transmits an Address Complete Message (ACM) to the initial MSC in response to the IAM. Further, the terminating MSC may receive supplementary service information of the caller by checking a receiver number of a caller, that is, a Mobile Station International Subscriber Directory Number (MS-ISDN) through the IAM. Further, the terminating MSC may allocate necessary resources through the IAM.

In the mobile communication system as described above, when subscribers A and B simultaneously try voice calls to each other, both lines of the subscribers A and B are busy. This is because the subscribers A and B have already started a signaling to communicate with each other and cannot process incoming calls.

FIGS. 1A to 1C are block diagrams illustrating cases in which subscribers simultaneously try calls to each other in a conventional mobile communication system.

FIG. 1A shows a case in which an MSC/VLR 100 of a subscriber A and an MSC/VLR 150 of a subscriber B simultaneously try routing to find roaming numbers of counterparts. In such a case, the subscribers A and B go into a busy state due to collision between messages thereof and will both get busy tones.

FIG 1B shows a case in which an MSC/VLR 100 of a subscriber A performs routing to find a roaming number of an MSC/VLR 150 of a counterpart B. In such a case, the MSC/VLR 150 of the counterpart B transmits an 'IAM' message to the MSC/VLR 100 of the subscriber A after the routing, so that an outgoing call is being processed.

FIG 1C shows a case in which an MSC/VLR 100 of a subscriber A has already performed a routing or an outgoing call is progressing, and an MSC/VLR 150 of a subscriber B is just performing an originating call signaling.

In the cases shown in FIGS. 1A to 1C, a call trial ends in a failure (reason: busy_subscriber) and the subscribers A and B both get busy tones.

In the conventional mobile communication system described above, when subscribers simultaneously try calls to each other, the call trial ends in a failure and the subscribers both get busy tones. Since the simultaneous call trial basically aims at communication with the counterpart, the busy tones are to be expected. In such a case, each subscriber may recognize that the counterpart is communicating with another person, and may call again after a while or give up the communication. As a result, it may become impossible to establish the communication between the subscribers.

SUMMARY OF THE INVENTION

Accordingly, the present invention has been made to solve the above-mentioned problems occurring in the prior art, and it is an object of the present invention to provide a method for improving a success rate of a simultaneous communication between subscribers through processing of a core network in a mobile communication system.

It is another object of the present invention to provide a method which prevents two subscribers trying simultaneous calls to each other from being processed as being in a busy state and enables a state of one of the two subscribers to be changed to a terminating state, thereby enabling communication between the two subscribers.

It is further another object of the present invention to provide a method in which a second subscriber network checks a VLR state of a second subscriber when a first subscriber and the second subscriber try simultaneous calls to each other, confirms a call trial between the two subscribers, releases the call trial of the second subscriber, and changes a state of the second subscriber to a terminating state, thereby enabling communication between the two subscribers.

In accordance with one aspect of the present invention, there is provided a method for improving a communication success rate in a simultaneous call trial between subscribers in a mobile communication system, the method including receiving by a second subscriber network an 'Initial Address Message (IAM)' message including a number of the first subscriber from a first subscriber network when a first subscriber tries a call to a second subscriber; checking by the second subscriber network whether the second subscriber has requested a termination to the first subscriber, after receiving the IAM; aborting by the second subscriber network an originating call trial of the second subscriber when the second subscriber has requested the termination to the first subscriber; trying by the second subscriber network paging to the second subscriber after aborting the originating call trial; and setting a call between the first subscriber and the second subscriber by the first subscriber network and the second subscriber network, after the second subscriber network succeeds in the paging to the second subscriber.

In accordance with another aspect of the present invention, there is provided a method for improving a communication success rate in a simultaneous call trial between subscribers in a mobile communication system, the method including receiving by a second subscriber network a 'Provide Roaming Number (PRN)' message including a number of a first subscriber from a Home Location Register (HLR) when the first subscriber tries a call to a second subscriber; checking by the second subscriber network whether the second subscriber has requested a termination to the first subscriber, after receiving the 'PRN' message; aborting by the second subscriber network an originating call trial of the second subscriber when the second subscriber has requested the termination to the first subscriber; trying by the second subscriber network paging to the second subscriber after transmitting a 'PRN ACK' message to the HLR; and setting a call between the first subscriber and the second subscriber by a first subscriber network and the second subscriber network, after the second subscriber network succeeds in the paging to the second subscriber and receives an 'Initial Address Message (IAM) message' from the first subscriber network.

In accordance with yet another aspect of the present invention, there is provided a method for improving a communication success rate in a simultaneous call trial between subscribers in a mobile communication system, the method including receiving by a second subscriber network a message including a number of the first subscriber from a first subscriber network when a first subscriber tries a call to a second subscriber; checking by the second subscriber network whether the second subscriber has requested a termination to the first subscriber, after receiving the message; aborting by the second subscriber network an originating call trial of the second subscriber when the second subscriber has requested the termination to the first subscriber; trying by the second subscriber network paging to the second subscriber after aborting the originating call trial; and setting a call between the first subscriber and the second subscriber by the first subscriber network and the second subscriber network, after the second subscriber network succeeds in the paging to the second subscriber.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1A:
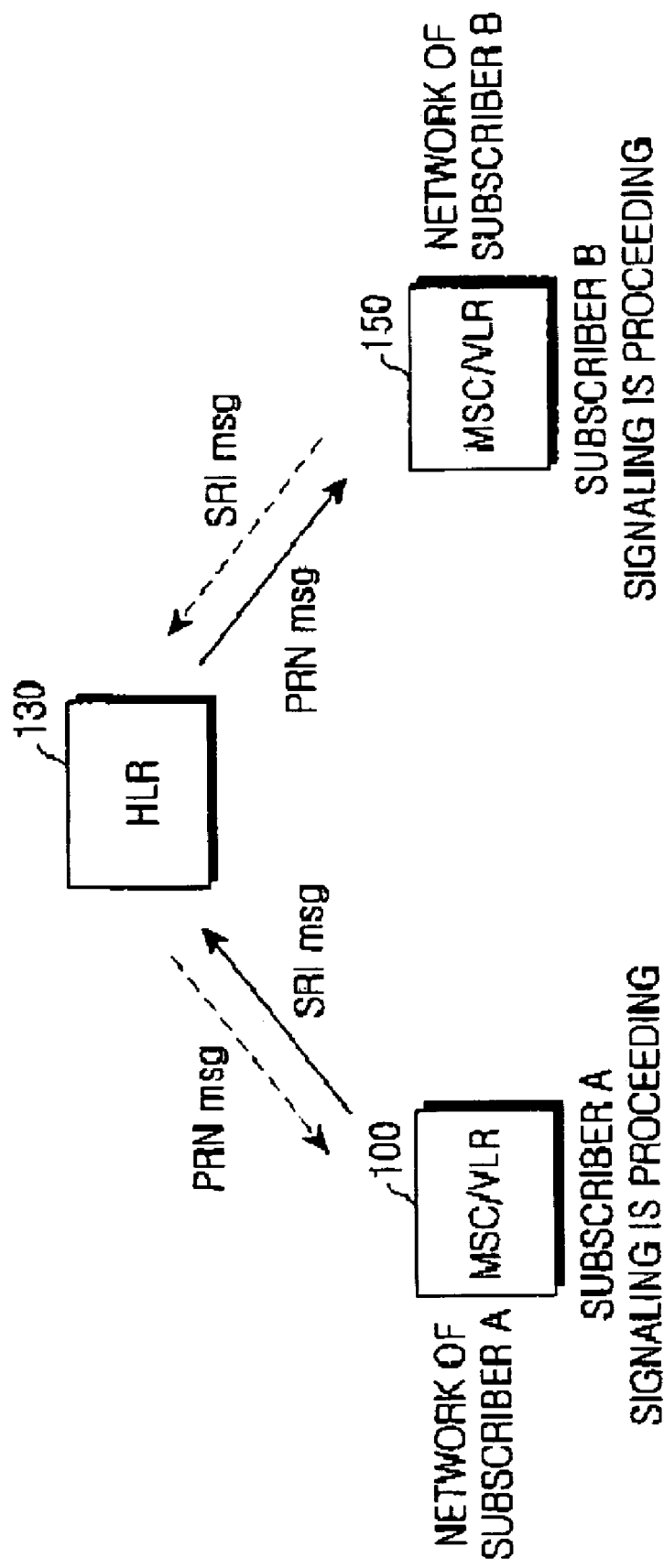
FIGS. 1A to 1C are block diagrams illustrating cases in which subscribers simultaneously try calls to each other in a conventional mobile communication system.
Figure 1B:
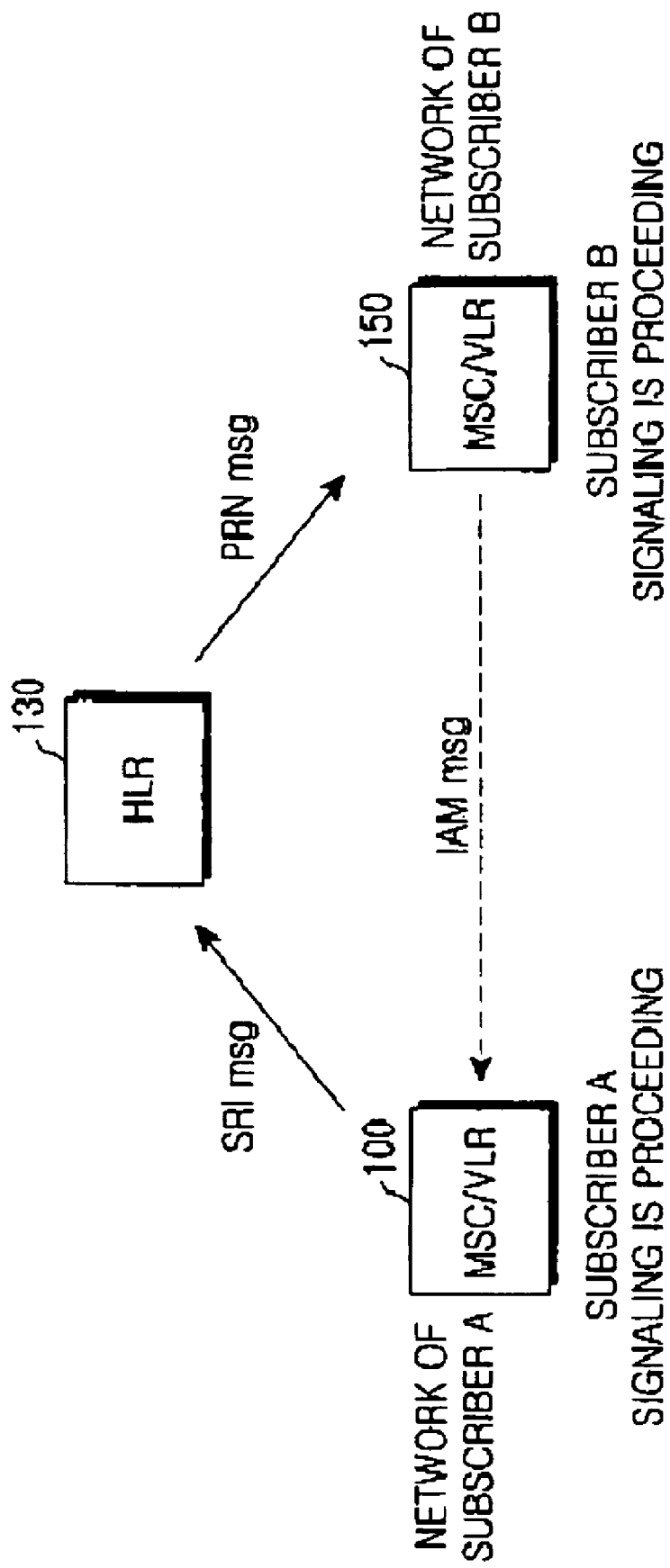
Figure 1C:
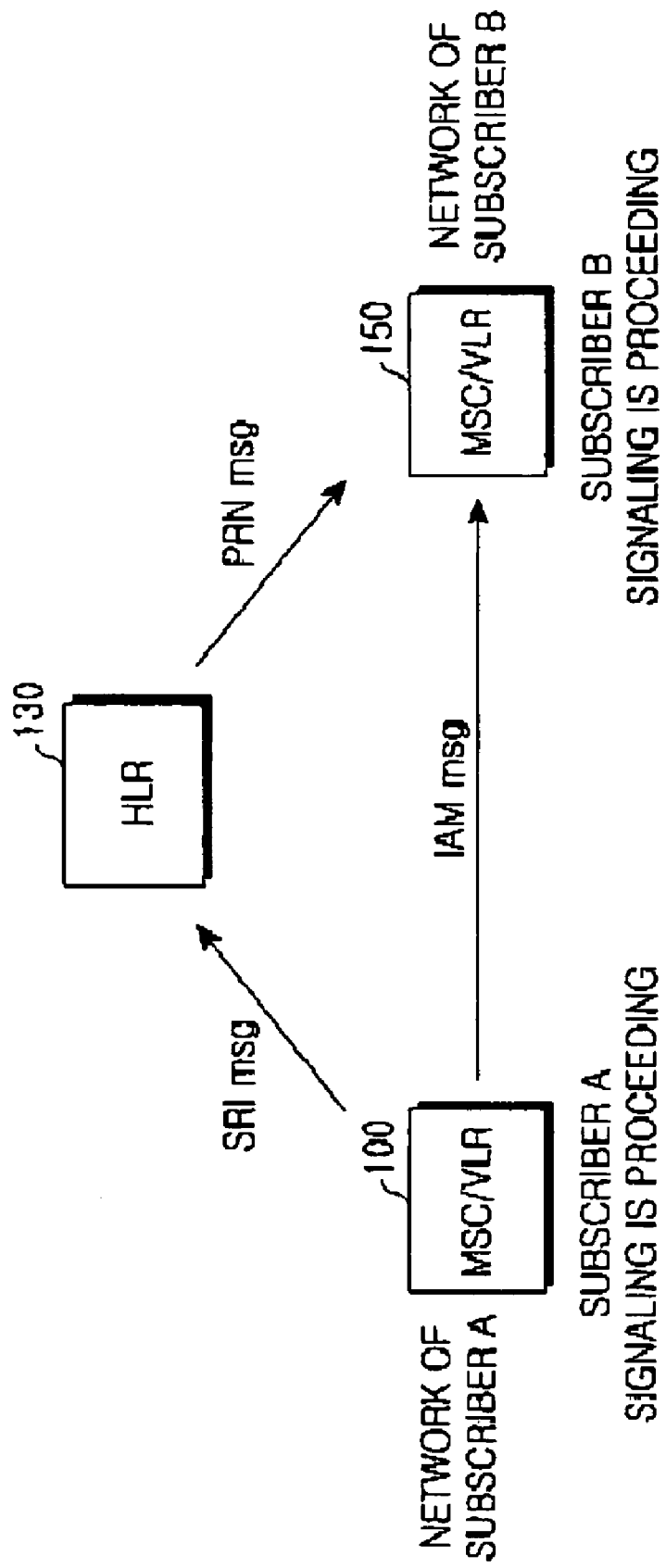

Hereinafter, preferred embodiments according to the present invention will be described with reference to the accompanying drawings. In the following description of the present invention, a detailed description of known functions and configuration incorporated herein will be omitted when it may make the subject matter of the present invention unclear. Terms described in the following description are defined by taking functions thereof into consideration, so they may vary according to intention of a user and an operator or depending on custom. Accordingly, the terms are to be defined based on the entire contents of the present invention.

In the present invention, subscribers are not classified by origination or termination. The case where two originating subscribers try calls to each other will be described.

The VLR of subscriber A and the VLR of subscriber B manage states of the subscribers as follows:

1) Idle state represents a state where a subscriber has performed a location registration after power-on;

2) P-Busy state represents a state where a subscriber tries signaling in an idle state and a VLR processes a service; and 3) Busy state represents a state where the line of a subscriber is busy, that is, the subscriber receives resources and communicates with another party.

The present invention defines additional sub-states of a subscriber network with respect to the P-Busy state as follows for processing of a simultaneous call trial in a state management of the subscriber.

A P-Busy_only state represents a state where a 'Process Access Request (PAR)' message has been transmitted from an MSC to a VLR.

Herein, the 'PAR' message is a used when the MSC queries the VLR whether signaling processing is possible for a current subscriber to process an originating or terminating call. When signaling processing is possible, the VLR transmits a 'PAR Ack' message to the MSC. Herein, the VLR may not recognize a called number of the subscriber yet.

A P-Busy_SIFOC state will be described. After the MSC receives the 'PAR Ack' message from the VLR and receives a 'SETUP' message including a called number from a terminal, the MSC transmits a 'Send Information For Outgoing Call (SIFOC)' message to the VLR again for processing of the originating call, that is, for performing an outgoing call signaling to a terminating subscriber. Therefore, the MSC informs the VLR of information used for performing the outgoing call signaling.

Herein, a state in which the MSC has transmitted the 'SIFOC' message to the VLR after receiving the 'SETUP' message including the called number from the terminal will be referred to as the P-Busy_SIFOC state. From this point on, the VLR may understand the called number of the originating subscriber.

The P-Busy_SRI_Sent state represents the state where the MSC transmits an 'SRI' message to an HLR to determine the location of the terminating subscriber, and the HLR transmits a 'PRN' message to the terminating VLR and determines whether the location information of the terminating subscriber and a call progress are valid.

The P-Busy_IAM_Sent state represents the state where the MSC has transmitted an 'IAM' message to the MSC of a called party's network to perform routing to the MSC of the terminating subscriber.

In relation to the VLR state information as described above, a communicable state may be represented as follows in a simultaneous call through signaling progress state information of subscribers A and B.

A Call_Success_Trial-possible_State_1 represents the state where subscriber A is in the P-Busy_SIFOC state and subscriber B is in the P-Busy_IAM_Sent state. Further, a Call_Success_Trial-possible_State_2 represents the state where subscriber A is in the P-Busy_SRI_Sent state and subscriber B is in the P-Busy_SIFOC state.

A Call_Success_Trial-possible state represents a state in which all of the subscribers A and B are in the P-Busy_SRI_Sent state or the P-Busy_IAM_Sent state, or one of the subscribers A and B is in the P-Busy_only state. In such a state, communication may not be done effectively.

In the conventional mobile communication system, when a counterpart subscriber is in the P-Busy state, it is determined that the line of the counterpart subscriber is busy. As a result, the caller gets a busy tone or communication with the counterpart subscriber is not established. In the present invention, when the VLR is in the Call_Success_Trial-possible_State_1 or 2 and a 'PRN' message or an 'IAM' message is received from the counterpart, it is determined whether a current state is a simultaneous call trial state through a Simultaneous Call Trial Match (SCTM) check algorithm. When the current state is the simultaneous call trial state, call processing is aborted and a call request of the counterpart is accepted and processed.

A VLR can abort the current signaling in progress and perform a currently requested incoming call processing according to the policies of carriers. Further, the VLR processes the current signaling in progress as a failure by transmitting a PRN negative response or processes a future 'IAM' message as busy, and sounds a busy tone to a subscriber, thereby reporting the busy state to the subscriber.

Herein, the SCTM algorithm is an algorithm for comparing an originating MS-ISDN information of a 'PRN' message with a called party number of the counterpart, and checking whether Mobile Country Codes (MCCs), Mobile Network Codes (MNCs), or Mobile Subscriber Identity Numbers (MSINs) of subscribers coincide with each other.

Figure 2:
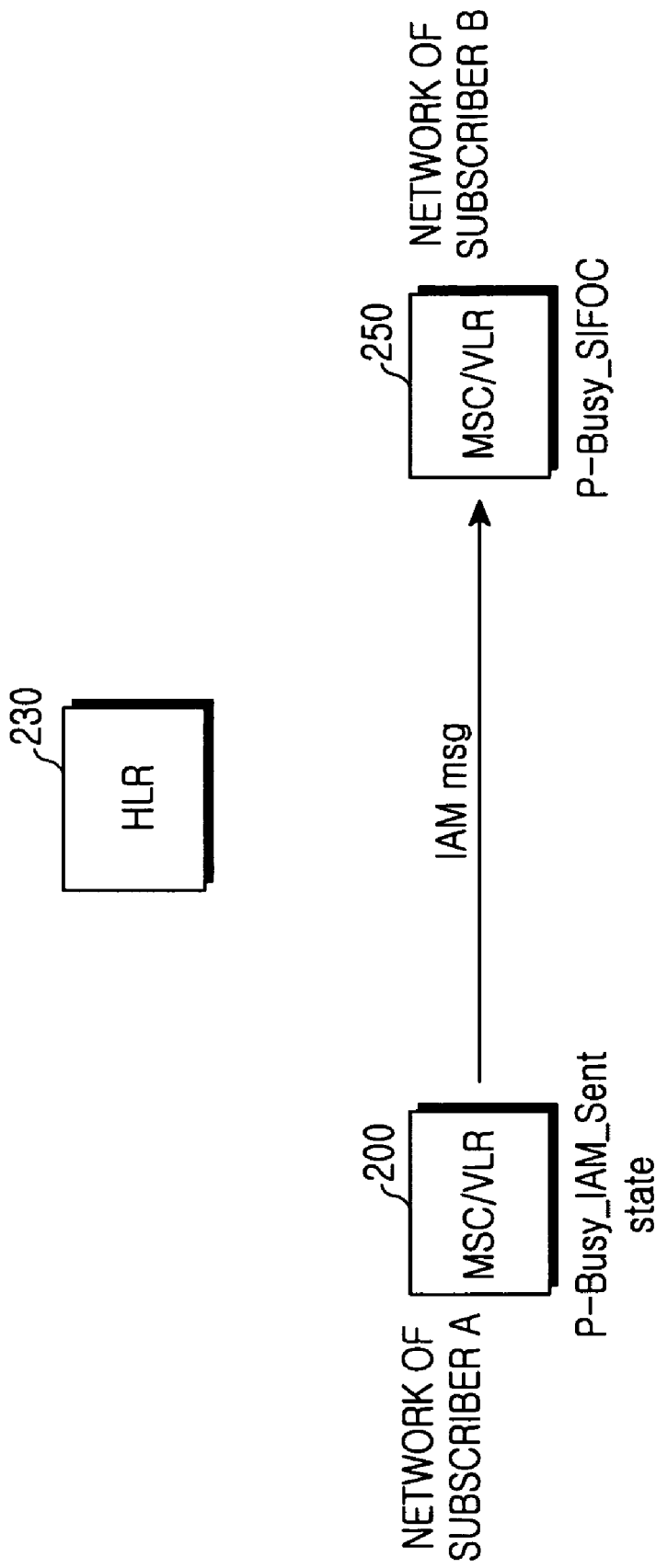
FIG. 2 is a block diagram illustrating a case in which subscribers try simultaneous calls to each other according to a first embodiment of the present invention.

FIG. 2 is a block diagram illustrating a case in which subscribers try simultaneous calls to each other according to a first embodiment of the present invention.

FIG. 2 shows an example of the Call_Success_Trial-possible_State_1; a state in which a network 200 of a subscriber A has transmitted an 'IAM' message to an MSC of a network 250 of a subscriber B according to a call processing signaling. That is, the network 200 of the subscriber A is in the P-Busy-_IAM_Sent state. Further, the network 250 of the subscriber B is in the P-Busy_SIFOC state where signaling has been just performed.

Figure 3:
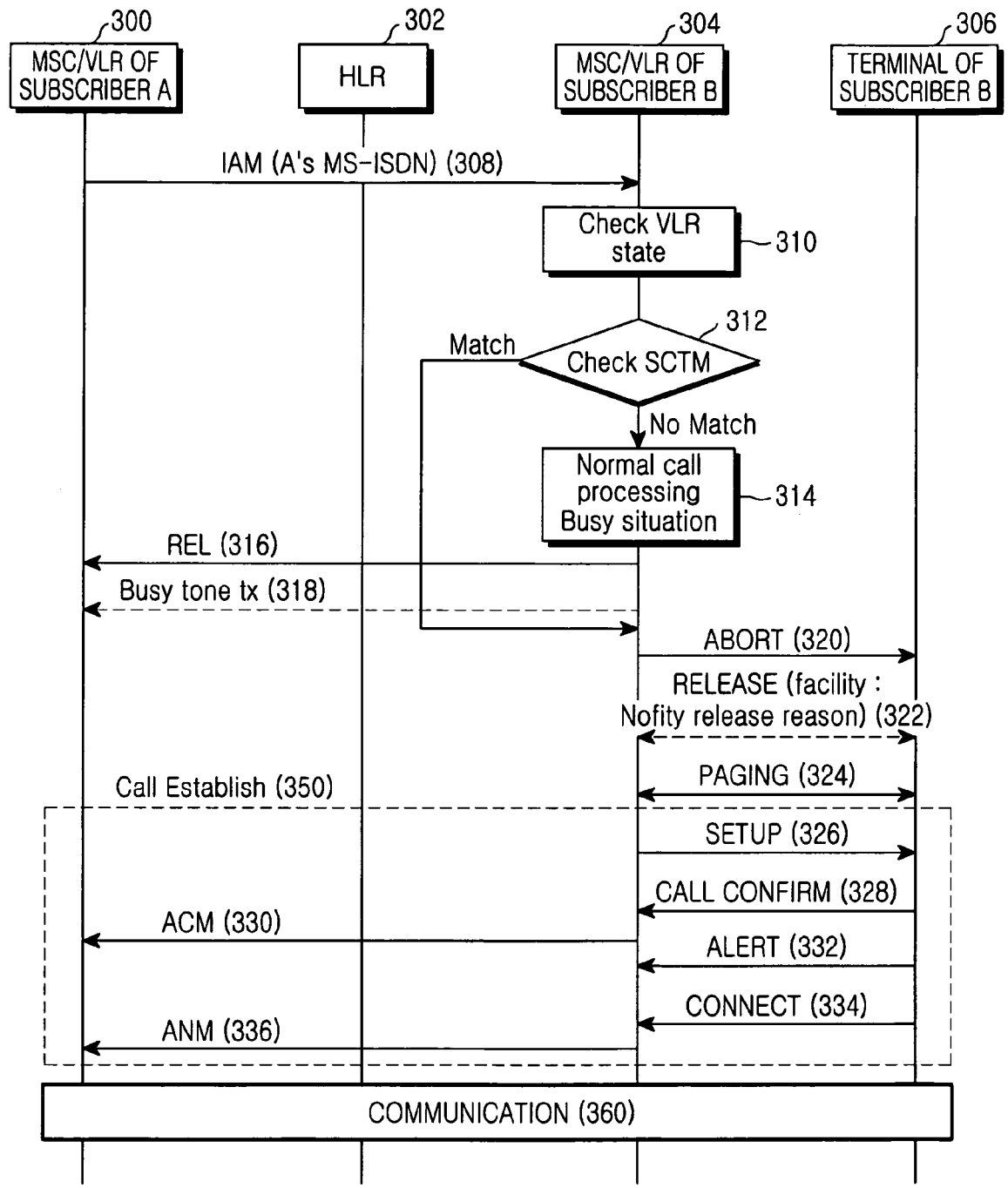
FIG. 3 is a flow diagram illustrating a procedure for enabling communication to be performed when the subscribers try simultaneous calls to each other according to the first embodiment of the present invention.

FIG. 3 is a flow diagram illustrating a procedure for enabling communication to be performed when the subscribers try simultaneous calls to each other according to the first embodiment of the present invention.

FIG. 3 shows the same state as that shown in FIG. 2. In step 308, a network 300 of subscriber A transmits an 'IAM' message to a network 304 of subscriber B. Since the 'IAM' message includes a caller number (i.e., MS-ISDN) of subscriber A, the network 304 of subscriber B checks a VLR state for subscriber B in step 310. In step 312, the network 304 receives the MS-ISDN of subscriber A and checks whether MCCs, MNCs, or MSINs of subscribers A and B coincide with each other by means of the SCTM algorithm. That is, the network 304 compares a called number from subscriber A with a number of subscriber B, and compares a called number from subscriber B with a number of subscriber A.

Herein, the fact that the caller number transmitted from subscriber A in a call setup is the MS-ISDN is applied, so that it is possible to use that the VLR can determine a call trial from the subscriber A to the subscriber B and a call trial from the subscriber B to the subscriber A.

As a result of the checking in step 312, if the called number from the subscriber A does not coincide with the number of the subscriber B, and the called number from the subscriber B does not coincide with the number of the subscriber A, the network 304 performs a general call processing in step 314. That is, since the subscriber B currently tries a call to another subscriber, the line of the subscriber B is busy. Accordingly, the network 304 transmits a 'RELEASE' message in step 316 and a busy tone in step 318 to the network 300 of subscriber A, and releases the call connection trial of subscriber A.

In contrast, if the called number from subscriber A coincides with the number of subscriber B, and the called number from subscriber B coincides with the number of subscriber A, that is, if subscriber A and subscriber B are both trying to call each other, the network 304 transmits an 'ABORT' message to a terminal 306 of subscriber B in step 320. In step 322, the network 304 exchanges a 'RELEASE' message with the terminal 306 of subscriber B to perform a terminating call processing of subscriber A, and aborts the current call trial.

Herein, since step 322 is performed when termination is accomplished during the origination, information indicating the reason for the abort is sent to subscriber B. Accordingly, the network 304 of informs subscriber B of the release reason by using a notification (NotifySS) type of a supplementary message or transmitting the 'RELEASE' message with facility information. Herein, since the location of the terminal of subscriber B has already been determined according to an originating call trial of the terminal of the subscriber B and the possibility of call processing has been confirmed, the network of the subscriber B just tries paging in step 324.

After succeeding in the paging for subscriber B, the network 304 of the subscriber B transmits a 'SETUP' message to the terminal 306 of subscriber B in step 326 within a terminating call establishment procedure 350 between subscriber A and subscriber B, which includes steps 326, 328, 330, 332, 334 and 336.

The terminal 306 of subscriber B transmits a 'CALL CONFIRM' message to the network 304 of subscriber B in step 328, and the network 304 of subscriber B transmits an 'ACM' message to the network 300 of subscriber A in step 330. The terminal 306 of subscriber B rings the bell in step 332 and transmits a 'CONNECT' message to the network 304 of subscriber B in step 334. In step 336, the network 304 of subscriber B transmits an Answer Message ("ANM"), a connection message, to the network 300 of subscriber A. In this way, subscriber B communicates with subscriber A (360).

Figure 4:
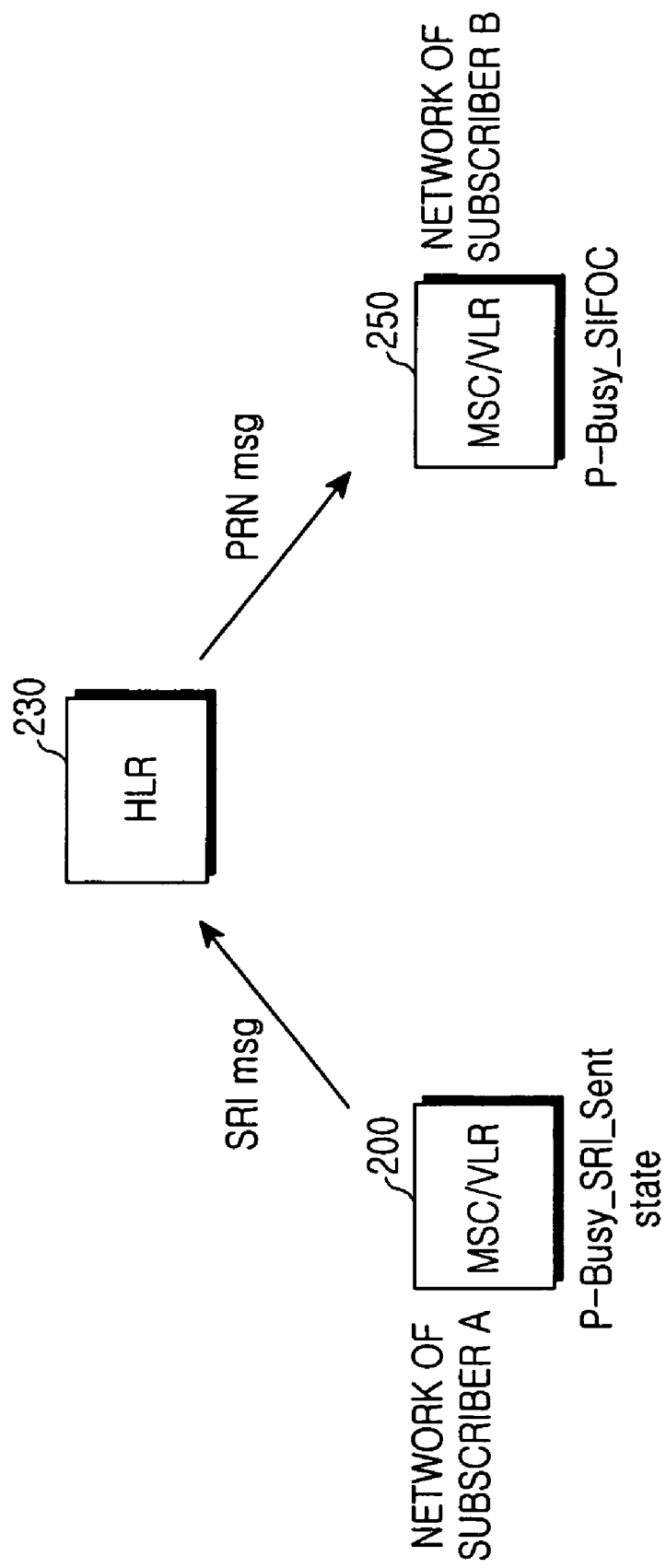
FIG. 4 is a block diagram illustrating a case in which subscribers try simultaneous calls to each other according to a second embodiment of the present invention.

FIG. 4 is a block diagram illustrating the case where subscribers try simultaneous calls to each other according to a second embodiment of the present invention. FIG. 4 shows an example of the Call_Success_Trial-possible_State_2.

In a call processing signaling of a network 200 of a subscriber A, a 'PRN' message has been transferred to a VLR of the network 250 of the subscriber B via an HLR 230. That is, the network 200 of the subscriber A is in the P-Busy_S-RI_Sent state. Further, the network 250 of the subscriber B is in the P-Busy_SIFOC state in which signaling has been just performed.

Figure 5:
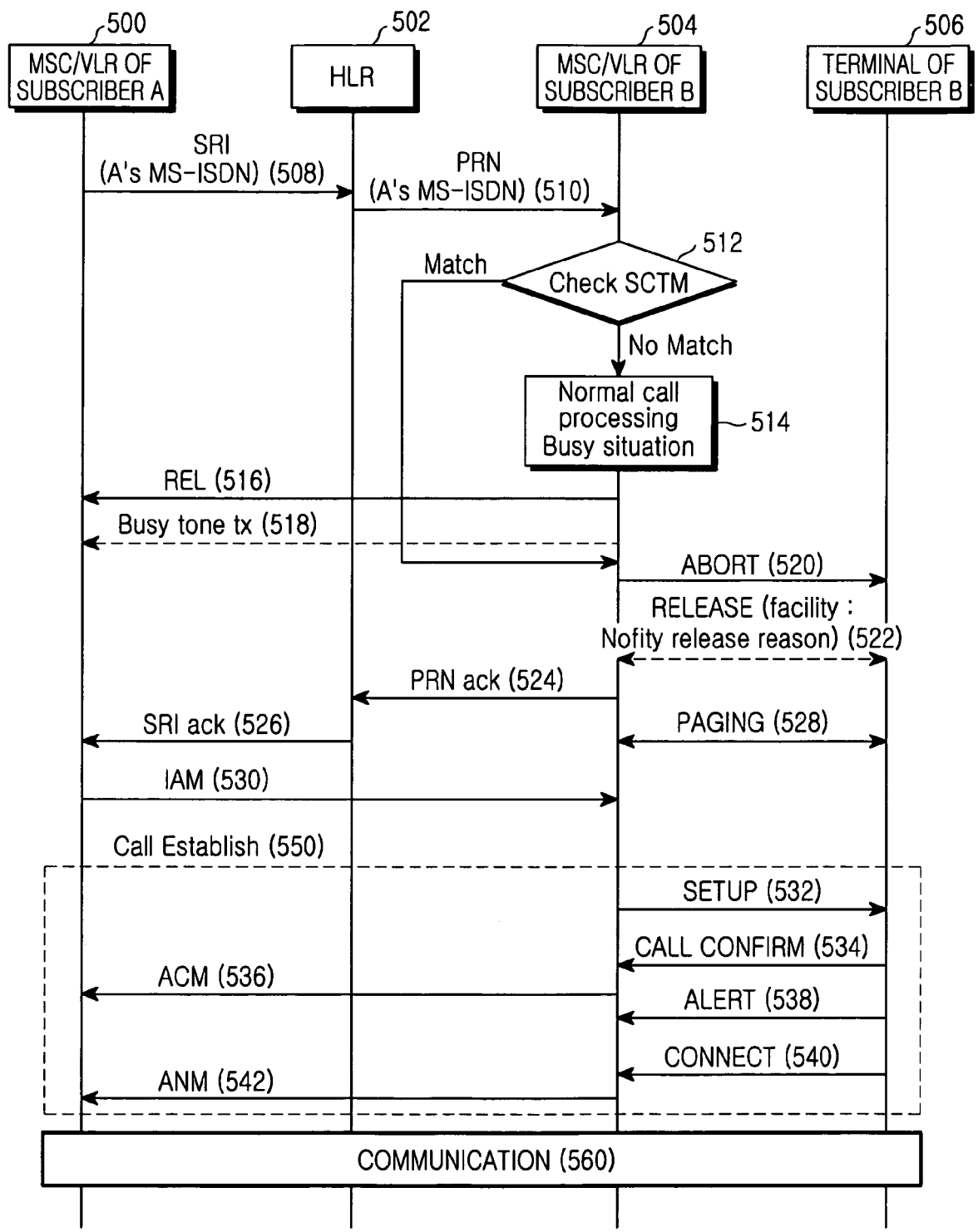
FIG. 5 is a flow diagram illustrating a procedure for enabling communication to be performed when the subscribers try the simultaneous calls to each other according to the second embodiment of the present invention.

FIG. 5 is a flow diagram illustrating a procedure for enabling communication when the subscribers try the simultaneous calls to each other according to the second preferred embodiment of the present invention.

In the embodiment of FIG. 5, messages proposed by the $3^{rd}$ Generation Partnership Project (3GPP) include additional parameter information to improve the success rate of communication. That is, in the second embodiment of the present invention, an 'SRI' message and a 'PRN' message additionally include MS-ISDN parameters of a calling subscriber.

A network 500 of a subscriber A transmits the 'SRI' message including the MS-ISDN information of the subscriber A to an HLR 502 in step 508, and the HLR 502 transmits the 'PRN' message including the MS-ISDN information of the subscriber A to the network 504 of subscriber B in step 510.

In step 512, the network 504 of subscriber B checks the MS-ISDN by the SCTM algorithm.

That is, the network 504 compares a called number from subscriber A with the number of subscriber B, and compares a called number from subscriber B with the number of subscriber A. As a result of the comparison, if the called number from subscriber A does not coincide with the number of subscriber B, and the called number from subscriber B does not coincide with the number of subscriber A—if subscriber A and B are not calling each other—the network 504 performs general call processing in step 514. That is, since subscriber B is trying to call a different subscriber other than subscriber A, subscriber A gets a busy tone. Accordingly, the network 504 transmits a 'RELEASE' message in step 516 and a busy tone in step 518 to the network 500 of subscriber A, and releases the call connection trial of subscriber A.

In contrast, if the called number from subscriber A coincides with the number of subscriber B, and the called number from subscriber B coincides with the number of subscriber A, that is, if subscriber A and B are trying to call each other, the network 504 transmits an 'ABORT' message to a terminal 506 of subscriber B in step 520 and releases the call trial from subscriber B to subscriber A in step 522.

Then, the network 504 transmits a 'PRN ACK' message to the HLR 502 in step 524 and the HLR 502 transmits an 'SRI ack' message to the network 500 of subscriber A in step 526.

The network 504 of subscriber B tries paging to its corresponding terminal 506 in step 528 and receives an 'IAM' message from the network 500 of subscriber A in step 530. Further, steps 532, 534, 536, 538, 540 and 542 represent a terminating call establishment procedure 550 between subscriber A and subscriber B. The network 504 of subscriber B transmits a 'SETUP' message to the terminal 506 of subscriber B in step 532 after passing through an SIFOC.

The terminal 506 of subscriber B transmits a 'CALL CONFIRM' message to the network 504 of subscriber B in step 534, and the network 504 of subscriber B transmits an 'ACM' message to the network 500 of subscriber A in step 536. The terminal 506 of subscriber B rings the bell in step 538 and transmits a 'CONNECT' message to the network 504 of subscriber B in step 540. In step 542, the network 504 of subscriber B transmits an 'ANM' message, a connection message, to the network 500 of subscriber A. Accordingly, subscriber B communicates with subscriber A (560).

In the present invention operating as described above in detail, an effect obtained by a representative embodiment of the present invention is as follows.

In the present invention, when a first subscriber and a second subscriber simultaneously telephone each other, that is, when the two subscribers are in a busy state, in other words, when a first subscriber VLR is in a P-Busy_IAM_Sent state and a second subscriber VLR is in a P-Busy_SIFOC state, or when the first subscriber VLR is in a P-Busy_SRI state and the second subscriber VLR is in a P-Busy_SIFOC state, communication between the two subscribers can be achieved even when the two subscribers simultaneously try to make a call to each other.

Preferred embodiments of the present invention have been described for illustrative purposes. However, for example, when a called party's network having received a specific message including a caller number, that is, an MS-ISDN, it is possible to allow communication to be performed through comparison using an SCTM algorithm in another embodiment. That is, those skilled in the art will appreciate that various modifications, additions and substitutions are possible, without departing from the scope and spirit of the invention as disclosed in the accompanying claims, including the full scope of equivalents thereof.

What is claimed is:

1. A method for improving a communication success rate in a simultaneous call trial between subscribers in a mobile communication system, the method comprising the steps of:
   a) receiving by a second subscriber network an 'Initial Address Message (IAM)' including a number of a first subscriber from a first subscriber network when the first subscriber tries a call to a second subscriber;
   b) determining by the second subscriber network whether the second subscriber has requested a termination to the first subscriber;

c) aborting by the second subscriber network an originating call trial of the second subscriber when the second subscriber has requested the termination to the first subscriber;

d) trying by the second subscriber network a page to the second subscriber after aborting the originating call trial; and e) setting a call between the first subscriber and the second subscriber by the first subscriber network and the second subscriber network, after the second subscriber network succeeds in paging the second subscriber.

2. The method as claimed in claim 1, further comprising releasing a call connection trial of the first subscriber by transmitting a 'RELEASE' message and a busy tone to the first subscriber network when the second subscriber is in a busy state and has not requested the termination to the first subscriber.

3. The method as claimed in claim 1, wherein step b) comprises receiving by the second subscriber network a 'SETUP' message including a called number from the second subscriber and determining by the second subscriber network that a Mobile Switching Center (MSC) within the second subscriber network has transmitted a 'Send Information For Outgoing Call (SIFOC)' message to a Visitor Location Register (VLR).

4. The method as claimed in claim 1, wherein step b) comprises comparing a called number requested from the first subscriber with a number of the second subscriber, and comparing a called number requested from the second subscriber with a number of the first subscriber.

5. The method as claimed in claim 1, wherein step b) comprises determining whether a Mobile Country Code (MCC), a Mobile Network Code (MNC), or a Mobile Subscriber Identity Number (MSIN) of the first subscriber coincides with a MCC, a MNC, or a MSIN of the second subscriber, respectively.

6. The method as claimed in claim 1, wherein step c) comprises transmitting by the second subscriber network an 'ABORT' message and a 'RELEASE' message to the second subscriber.

7. The method as claimed in claim 1, wherein step e) comprises:
transmitting a 'SETUP' message to the second subscriber;
transmitting by the second subscriber network an 'Address Complete Message (ACM)' to the first subscriber network after receiving a 'CALL CONFIRM' message from the second subscriber; and
allowing a bell to sound for the second subscriber and transmitting an 'Answer Message (ANM)' message to the first subscriber network when a 'CONNECT' message is received from the second subscriber.

8. A method for improving a communication success rate in a simultaneous call trial between subscribers in a mobile communication system, the method comprising the steps of:
a) receiving by a second subscriber network a 'Provide Roaming Number (PRN)' message including a number of a first subscriber from a Home Location Register (HLR) when the first subscriber tries a call to a second subscriber;
b) determining by the second subscriber network whether the second subscriber has requested a termination to the first subscriber;
c) aborting by the second subscriber network an originating call trial of the second subscriber when the second subscriber has requested the termination to the first subscriber;

d) trying by the second subscriber network a page to the second subscriber after transmitting a 'PRN ACK' message to the HLR; and e) setting a call between the first subscriber and the second subscriber by a first subscriber network and the second subscriber network, after the second subscriber network succeeds in the paging to the second subscriber and receives an 'Initial Address Message (IAM)' from the first subscriber network.

9. The method as claimed in claim 8, wherein the 'PRN' message is a number of the first subscriber, which includes a Mobile Station International Subscriber Directory Number (MS-ISDN).

10. The method as claimed in claim 9, further comprising transmitting by the HLR the 'PRN' message to the second subscriber network after receiving a 'Send Routing Information (SRI)' message including the number of the first subscriber from the first subscriber network.

11. The method as claimed in claim 8, further comprising releasing a call connection trial of the first subscriber by transmitting a 'RELEASE' message and a busy tone to the first subscriber network when the second subscriber is in a busy state and has not requested the termination to the first subscriber.

12. The method as claimed in claim 8 wherein step b) comprises comparing a called number requested from the first subscriber with a number of the second subscriber, and comparing a called number requested from the second subscriber with a number of the first subscriber.

13. The method as claimed in claim 12, wherein step b) comprises determining whether a Mobile Country Code (MCC), a Mobile Network Code (MNC), or a Mobile Subscriber Identity Number (MSIN) of the first subscriber coincides with a MCC, a MNC, or a MSIN of the second subscriber, respectively.

14. The method as claimed in claim 8, wherein step c) comprises transmitting by the second subscriber network an 'ABORT' message and a 'RELEASE' message to the second subscriber.

15. The method as claimed in claim 8 wherein step e) comprises:
transmitting a 'SETUP' message to the second subscriber according to the 'IAM' message;
transmitting by the second subscriber network an 'Address Complete Message (ACM)' to the first subscriber network after receiving a 'CALL CONFIRM' message from the second subscriber; and
allowing a bell to sound for the second subscriber and transmitting an 'Answer Message (ANM)' to the first subscriber network when a 'CONNECT' message is received from the second subscriber.

16. A method for improving a communication success rate in a simultaneous call trial between subscribers in a mobile communication system, the method comprising the steps of:
a) receiving by a second subscriber network a message including a number of a first subscriber from a first subscriber network when a first subscriber tries a call to a second subscriber;
b) determining by the second subscriber network whether the second subscriber has requested a termination to the first subscriber;
c) aborting by the second subscriber network an originating call trial of the second subscriber when the second subscriber has requested the termination to the first subscriber;

d) trying by the second subscriber network a page to the second subscriber after aborting the originating call trial; and e) setting a call between the first subscriber and the second subscriber by the first subscriber network and the second subscriber network, after the second subscriber network succeeds in paging the second subscriber.

17. The method as claimed in claim 16, further comprising releasing a call connection trial of the first subscriber by transmitting a 'RELEASE' message and a busy tone to the first subscriber network when the second subscriber is in a busy state and has not requested the termination to the first subscriber.

18. The method as claimed in claim 16, wherein the number of the first subscriber includes a Mobile Station International Subscriber Directory Number (MS-ISDN).

19. The method as claimed in claim 16, wherein step b) comprises comparing a called number requested from the first subscriber with a number of the second subscriber, and comparing a called number requested from the second subscriber with a number of the first subscriber.

20. The method as claimed in claim 19, wherein step b) comprises determining whether a Mobile Country Code (MCC), a Mobile Network Code (MNC), or a Mobile Subscriber Identity Number (MSIN) of the first subscriber coincides with a MCC, a MNC, or a MSIN of the second subscriber, respectively.

21. The method as claimed in claim 16, wherein step e) comprises:

transmitting a 'SETUP' message to the second subscriber;

transmitting by the second subscriber network an 'Address Complete Message (ACM)' to the first subscriber network after receiving a 'CALL CONFIRM' message from the second subscriber; and allowing a bell to sound for the second subscriber and transmitting an 'Answer Message (ANM)' to the first subscriber network when a 'CONNECT' message is received from the second subscriber.

* * * * *